(12) United States Patent
Zhnag

(10) Patent No.: US 7,003,291 B2
(45) Date of Patent: Feb. 21, 2006

(54) FIXED WIRELESS NETWORK EXTENDER

(76) Inventor: Franklin Zhigang Zhnag, 4808 Laurette St., Torrance, CA (US) 90503

(*) Notice: Subject to any disclaimer, the term of this patent is extended or adjusted under 35 U.S.C. 154(b) by 202 days.

(21) Appl. No.: 09/991,508

(22) Filed: Nov. 16, 2001

(65) Prior Publication Data
US 2002/0061729 A1  May 23, 2002

Related U.S. Application Data

(60) Provisional application No. 60/252,028, filed on Nov. 18, 2000.

(51) Int. Cl.
*H04Q 7/20* (2006.01)
(52) U.S. Cl. ........................ 455/424; 455/557
(58) Field of Classification Search ........... 455/561, 455/554.1, 3.06, 424, 418, 3.03, 3.05, 550.1, 455/554.2, 556.1, 557; 725/63, 73; 709/217, 709/218
See application file for complete search history.

(56) References Cited

U.S. PATENT DOCUMENTS 5,410,737 A * 4/1995 Jones ........................ 455/454
6,418,131 B1 * 7/2002 Snelling et al. ............. 370/337
6,526,580 B1 * 2/2003 Shimomura et al. .......... 725/63

* cited by examiner

*Primary Examiner*—Nay Maung
*Assistant Examiner*—Tu X. Nguyen (57) ABSTRACT

A processor unit (164) with two system buses: bus1 (161) and bus2 (162), which multiple wireless networking radio units (102,112,122,132) and multiple wired networking units (165,166,167,168) can be connected to. The processor unit (164) is the system-operating platform, and perform the networking functions among the networking units. A radio control unit (163) monitors and controls the physical layer of radio performance. Each wireless networking radio unit (102,112,122,132) and correspondent directional antenna (101,111,121,131) will communicate with remote same type of wireless networking device and form a wireless network link. Multiple wired networking units (165,166,167,168) can connect to wired networks. The number and type of the wireless networking radio units (102,112,122,132) and wired networking units (165,166,167,168) can be selected and installed according to specific networking requirement to configure the hardware system of the device. The Fixed Wireless Network Extender (FWNE) device (10) can be configured with multiple different wireless networking radio units, to communicate with multiple different wireless networks, extend the range of the wireless network.

13 Claims, 5 Drawing Sheets

FIXED WIRELESS NETWORK EXTENDER

CROSS-REFERENCE TO RELATED APPLICATIONS

This application claims the benefit of Provisional Patent Application Ser. No. 60/252,028 filed Nov. 18, 2000.

BACKGROUND

1. Field of Invention

This invention relates to a network device for fixed wireless networking, specifically to improving fixed wireless networking deployment.

2. Description of Prior Art

Fixed wireless networking uses wireless communication radios to create digital data network links between multiple networking devices and/or networks. For wireless networking, a pair of wireless bridges connects two remote networks together forming a point-to-point wireless link; an Access Point (AP) communicates with multiple remote Subscribe Units (SU) forming point-to-multi-point wireless connections. Wireless Point Of Presents (WPOP) is built for outdoor wireless network deployment. WPOP works as a central access node for multiple remote wireless networking devices. To perform the networking features, WPOP comprises more than one AP and/or other wireless networking devices to form the wireless links with remote wireless devices; and also, comprises a router and/or ATM switch to interface to wired network. One or more WPOP form a fixed wireless network.

Broadband wireless networking radios operate at high radio frequency (Microwave) are different from cellular phone radios. Higher radio frequency (Microwave) is adopted in the wireless networking technology. Line Of Sight (LOS) is necessary for the microwave wireless network radio technology. Different wireless networking radios, also are characterized with different radio frequency, gain, and communication protocol. One wireless networking radio can only communicate with other radios under the condition of Line Of Sight, same radio frequency, same communication protocol, and within the distance limited by the transmitting gain regulations.

Typical WPOP always has wired network connections to link the wired and wireless networks together. WPOP also comprises multiple wireless networking devices, router and/or ATM switch and other support accessories to provide higher bandwidth, more connections to remote clients, and avoid interferences. WPOP usually requires high bandwidth, high reliability connection, such as, T1 or T3 wired connection, or licensed band high-class backbone radio. So WPOP location must be well connected and has physical capability to accommodate multiple expensive electronics equipments. It is very complicate and high costly to setup WPOP.

WPOP of fixed wireless network serves as a regional center node of wireless links with a limited distance of radiation coverage area. In order to have LOS communicate with remote devices, fixed wireless network WPOP must be located at high geographical locations, such as on the top of a high building or a high tower. However: 1) even within the WPOP coverage area, a remote device may not be able to communicate with WPOP because of non-LOS. LOS is not always available because of there might be a tall building or other geographical obstacle blocks the link between WPOP and remote device; 2) Remote device site is not always within the coverage of WPOP. In order to get connected, additional WPOP need to be setup as a repeater site. It can be very costly to do it.

SUMMARY

A Fixed Wireless Network Extender (FWNE) device serves as a wireless extension node and improves the deployment of fixed wireless networking greatly. The device comprises system buses on which the networking modules can be attached to; a system processor unit which works as the operation platform also performs networking functions; a radio control unit which can monitor and control radio units; a pluarity of wireless network radio units which connect to the device via PCMCIA control units or system buses directly. By integration of the different types of the wireless network radio units, the FWNE can communicate with multiple different fixed wireless networks, and works as amultifunction fixed wireless networking node. The device can also work as a repeater node to overcome the non Line Of Sight issue and extend the coverage of wireless network.

OBJECTS AND ADVANTAGES

Accordingly, several objects and advantages of my invention are:

(a) to provide a wireless networking device, which is able to perform multiple wireless networking functions in one box;

(b) to provide a wireless networking device which is able to connect with multiple wireless and wired networks;

(c) to provide a wireless networking device which is able to connect with multiple different wireless and wired networks;

(d) to provide a wireless networking device which is able to extend the wireless network range by joint multiple different wireless network together;

(e) to provide a wireless networking device which requires less installation conditions than the prior art of WPOP;

(f) to provide a wireless networking device which can be easily deployed to a geographical location to solve the non Line Of Sight issue of the prior art of WPOP;

Still further objects and advantages will become apparent from a consideration of the ensuing description and accompanying drawings.

REFERENCE NUMERALS 10 the FWNE device
101,111,121,131 directional antenna
102,112,122,132 wireless networking radio unit1, 2,3,4
140,141 PCMCIA controller and interface circuit
161,162 system bus1, 2
163 radio control unit
164 processor unit
165,166,167,168 wired networking unit1,2,3,4
21,22,23 network1,2,3
211,221 directional antenna
212,222 wireless link
31,32,33 network1',2',3'
311,321,331 directional antenna
301,302,303 wireless link
41 remote main network
42,43,44 sub network1,2,3
422,432,442 directional antenna
411,421,431,441 wireless link
51 wired main network
513,523,533 sub network1',2',3'
511,521,531 wireless link
512,522,532 directional antenna

Summary Including Objects and Advantages

A Fixed Wireless Network Extender (FWNE) device serves as a wireless extension node and improves the deployment of fixed wireless networking greatly. The device comprises system buses on which the networking modules can be attached to; a system processor unit which works as the operation platform also performs networking functions; a radio control unit which can monitor and control radio units; multiple wireless network radio units which connect to the device via PCMCIA control units or system buses directly. By integration of the different types of the wireless network radio units, the FWNE can communicate with multiple different fixed wireless networks, and work as a multifunction fixed wireless networking node. The device can also work as a repeater node to overcome the non Line Of Sight issue and extend the coverage of wireless network.

Description—Preferred Embodiment

Figure 1:
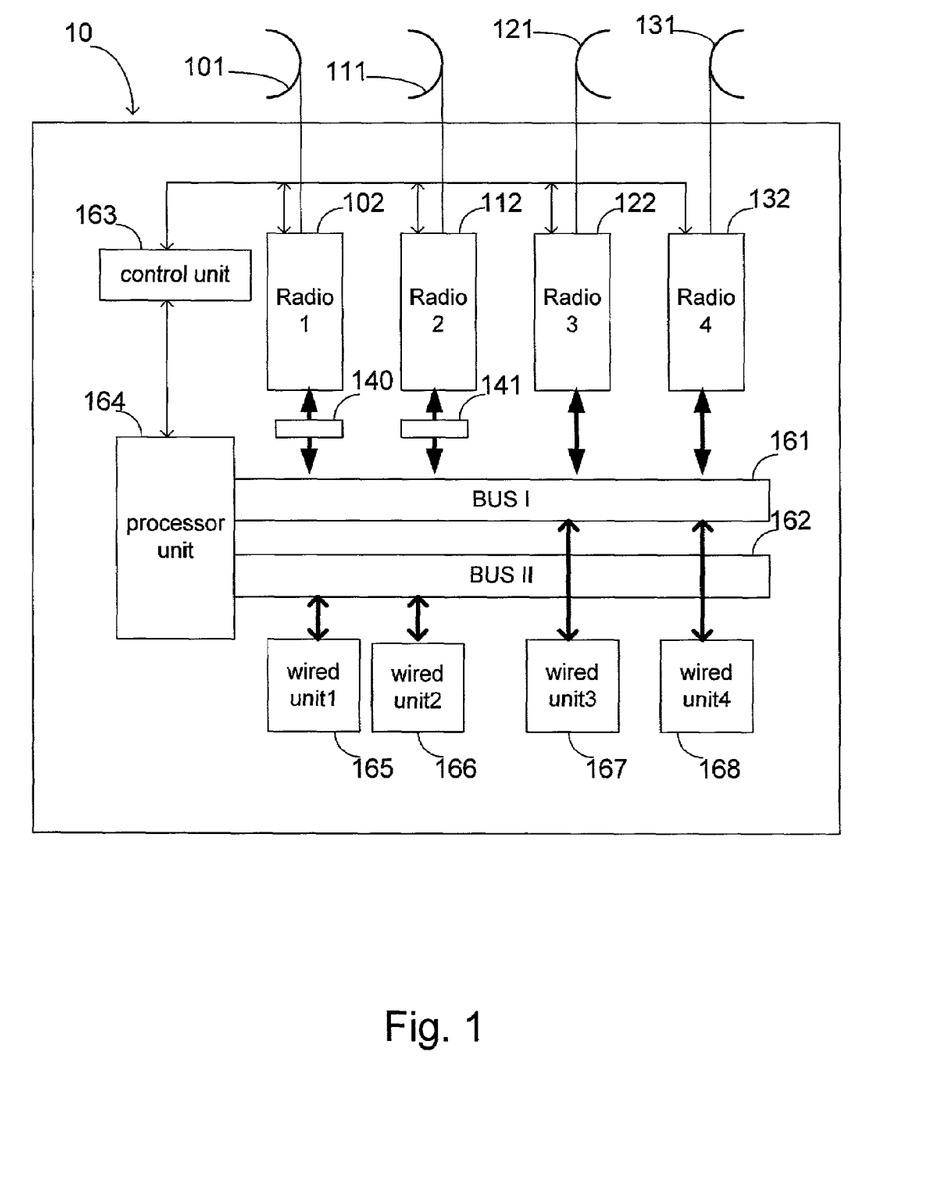
FIG. 1 is a block diagram of the FWNE device with a plurality of individual wireless networking radio units and wired networking units.

As shown in FIG. 1, the FWNE device 10 comprises four individual wireless network radio units 102, 112, 122, 132 and wired networking units 165, 166, 167, 168. Each radio unit 102, 112, 122, 132 connects to its own directional antenna 101,111,121,131. In combining with its own directional antenna, each radio unit can be configured to communicate with the remote wireless device. Those four radio units 102, 112, 122, 132 can be different types of wireless networking radios. The FWNE device 10 has one processor unit 164 to perform the networking features such as routing, bridging and etc, and also networking management functions. The FWNE device 10 comprises a radio control unit 163, which controls the physical layer performance of each radio. The FWNE device 10 also has two buses 161, 162, which the radio units 102,112,122,132 and the wired networking units 165,166,167,168 are connected to. The bus1 161 is ISA bus, which the radio units 102 and 112 are connected to via PCMCIA controller and interface circuits 140, 141. The bus2 162 is PCI bus, wired unit1 165 and unit2 166 are connected to directly.

Figure 2:
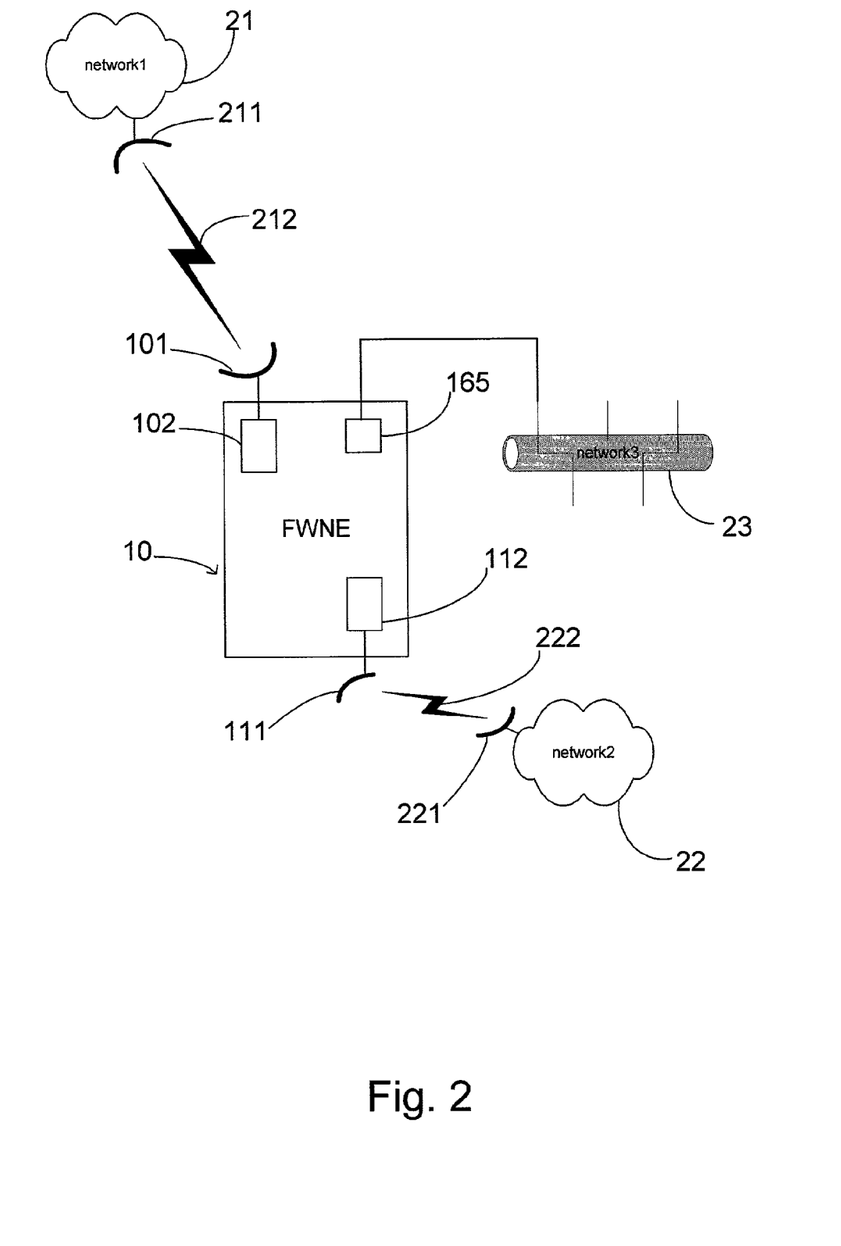
FIG. 2 is a schematic representation of fixed wireless network extension deployment utilizing the FWNE device.

FIG. 2

The FWNE device 10 is working as a remote node for the network1 21 to connect to network2 22 wirelessly and network3 23. In this embodiment, the FWNE device 10 is configured with two wireless networking radio units 102, 112 and the wired networking unit 165. The distance between network1 21 and network2 22 is longer than the range of the wireless radio units can reach, or the Line Of Sight (LOS) is unavailable for them to establish a direct wireless connection. The radio unit 102 and antenna 101 of the FWNE device 10 is configured with the ability to communicate with the radio of the far end network1 21; Radio unit 102 and Antenna 101 communicate with antenna 211 and the radio behind it form the wireless link 212. The radio unit 112 and antenna 111 of the FWNE device 10 is configured with the ability to communicate with the radio of network2 22; radio unit 112 and Antenna 111 communicate with antenna 221 and the radio behind it form the wireless link 222. Also there may be a wired network 165 connects to the wired unit of FWNE device 10 The processor unit 164 of the FWNE device 10 handles the networking packets according to the network configuration. The FWNE device 10 extends the range of the network1 21 to network 2 22. This is a simple application of the FWNE device 10.

Figure 3:
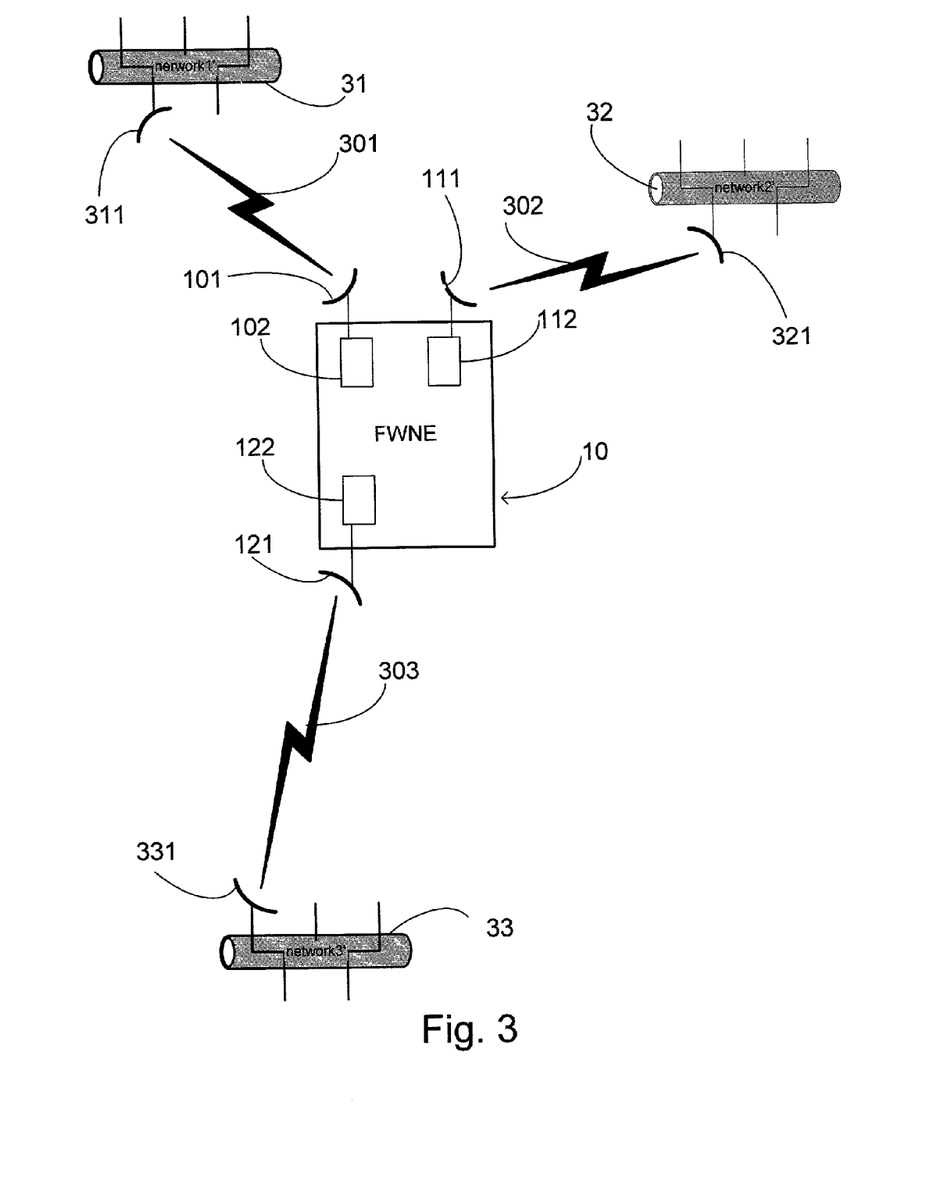
FIG. 3 is a schematic representation of utilizing the FWNE device as a center node for fixed wireless network deployment.

FIG. 3

In this embodiment, the FWNE device 10 is configured with three wireless networking radio units 102, 112, and 122. Radio unit1 102 with antenna 101 communicates to network1' 31 via antenna 311 and the radio behind it; Radio unit2 112 with antenna 111 communicates to network2' 32 via antenna 321 and the radio behind it; Radio unit3 122 with antenna 121 communicates to network3' 33 via antenna 331 and the radio behind it. The processor unit 164 of the FWNE device 10 handles the networking packets among three networks 31,32,33 according to the network configuration. Each of the wireless networking radio unit communicates with remote same type of wireless network radio. The most comment function of this embodiment is that FWNE device 10 working as a multi port router or multi protocol bridge.

Figure 4:
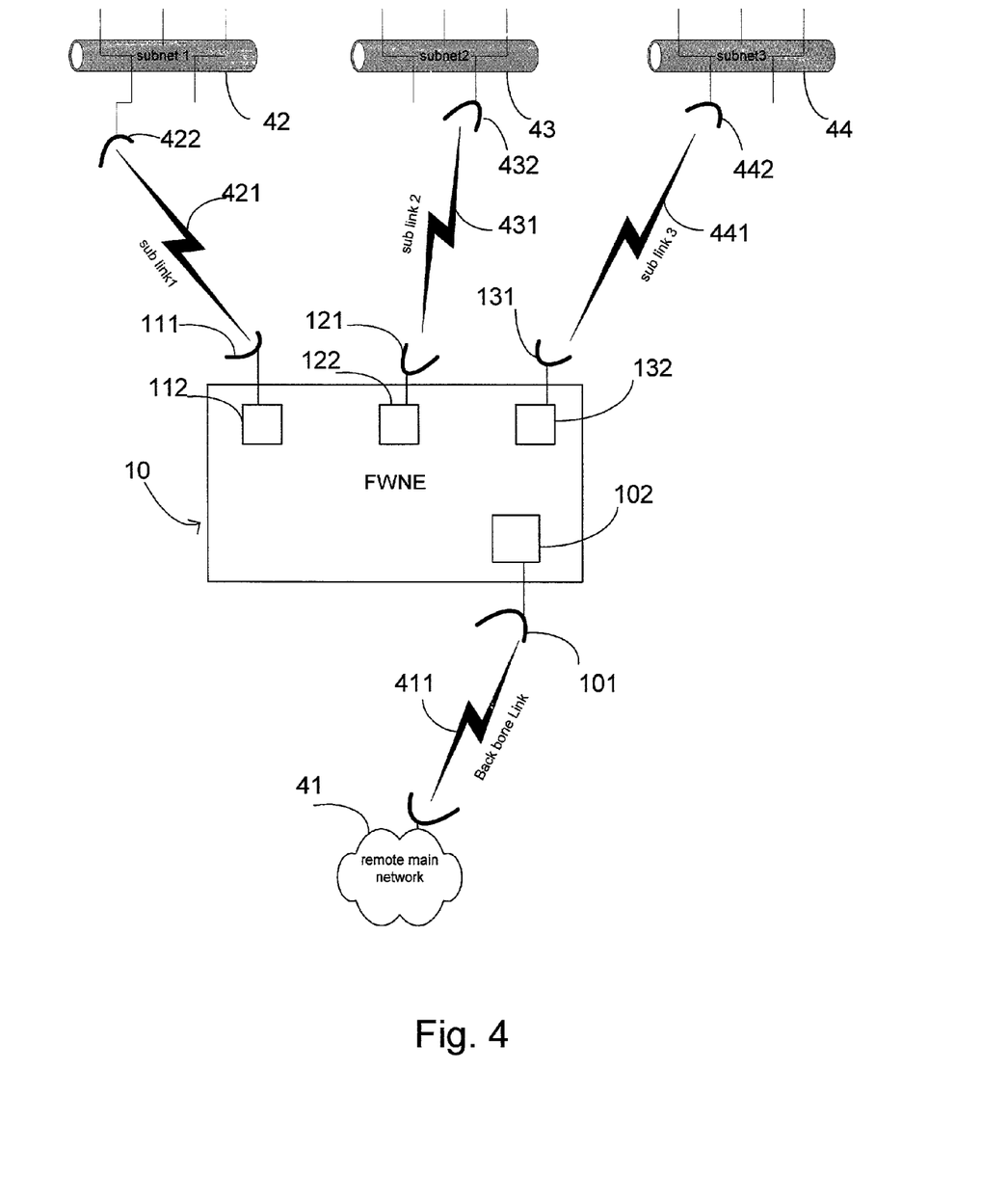
FIG. 4 is a schematic representation of utilizing the FWNE device as a bandwidth distribution node for fixed wireless network deployment.

FIG. 4 shows utilizing present invention as a distributing node for fixed wireless network. In this embodiment, the bandwidth for remote main network 41, such as Internet, is distributed via the FWNE device 10 to three sub networks: sub network1 42, sub network2 43, sub network 3 44 wirelessly. The FWNE device 10 is configured into one main link 411 radio channel, and three sub link radio channels 421,431,441.

Figure 5:
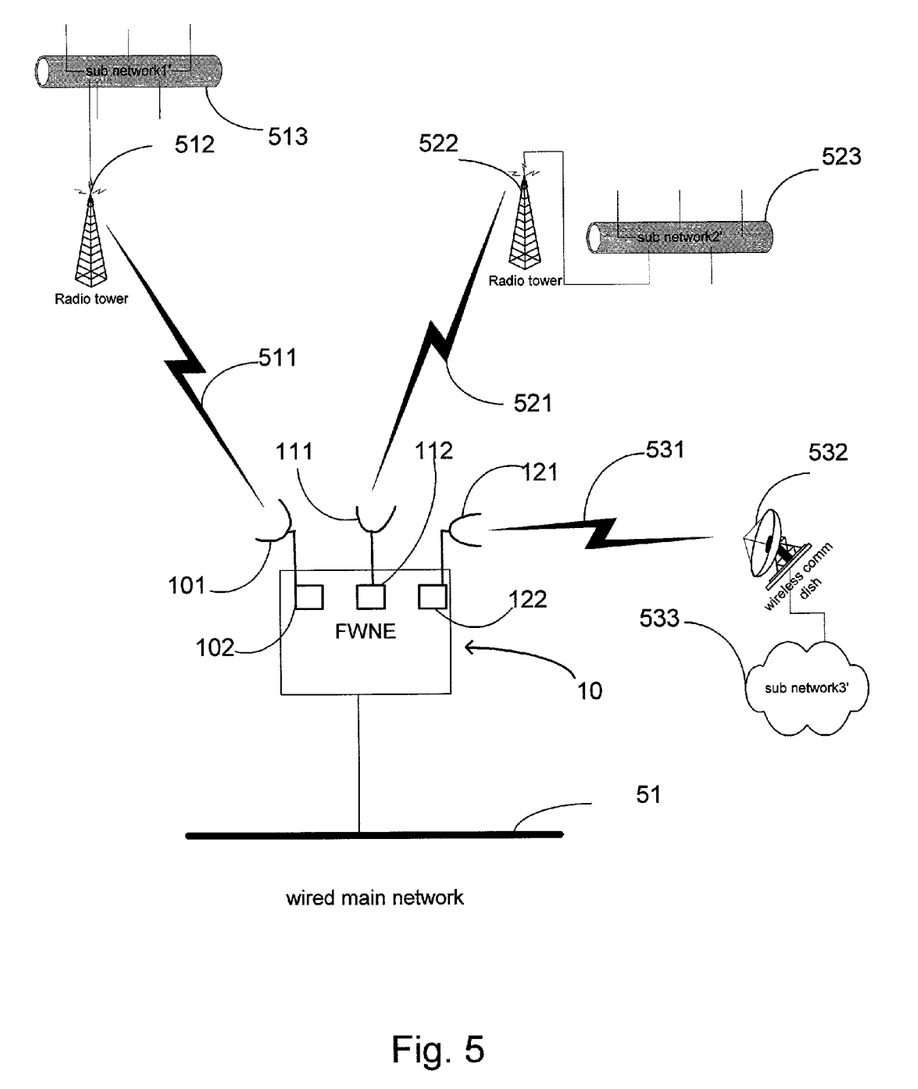
FIG. 5 is a schematic representation of utilizing the FWNE device as a main node for a wired main network connecting to a plurality of sub networks via different fixed wireless links.

FIG. 5 shows utilizing present invention as a main node for a wired main network connects with three sub networks via different directional fixed wireless links. In this embodiment, the FWNE device 10 is configured with three different radio units 102,112,122 and antennas 101,111,121. Among which: (1) The radio unit1 102 and antenna 101 is communicating with remote wireless networking device 512, so as to link the sub network1' 513 to the wired main network 51. The wireless link 511 between antenna 101 and remote wireless networking device 512 has its own wireless link character including radio frequency, modulation, protocol and etc. (2) The radio unit2 112 and antenna 111 is communicating with remote wireless networking device 522, so as to link the sub network2' 523 to the wired backbone network 51. The wireless link 521 between antenna 111 and remote wireless networking device 522 has its own wireless link character including radio frequency, modulation, protocol and etc. (3) The radio unit3 122 and antenna 121 is communicating with remote wireless networking device 532, so as to link the sub network3' 533 to the wired main network 51. The wireless link 531 between antenna 121 and remote wireless networking device 532 has its own wireless link character including radio frequency, modulation, protocol and etc.

Preferred Embodiment—Operation

The FWNE device 10 functions as a key element of the fixed wireless networking deployment. The processor unit 164 is a computer processor loaded with operating system as well as networking function. The processor units 164 performs the networking packets exchanging among the network channels. To the processor unit, all the wireless and wired networking units function as network interface. Typically, the processor unit can route, switch, or bridge the networking packets among the wireless and wired network interfaces. The whole FWNE 10 functions as a multi interface network device. By exchanging the networking packets among the networking units, the FWNE 10 extends the range of one network to another via different networking unit. Control unit 163 of the FWNE 10 controls the physical layer elements of the radios. Via control unit 163, the processor unit 164 can monitor and control the electronic of the radio units, and functions the system control of the radio performance, such as additional gain control, and antenna control. The modular system design allows the FWNE device 10 having different configuration. In order to connect different number and/or different type of wireless and wires networks, different specific wireless networking radio units must be pre-installed and configured before installing the device to the field.

FIG. 2 Operation

In this embodiment, network1 21 need be connected to network2 22 and network3 23. The range of wireless networking units can reach is shorter than the distance between network1 21 and network2 22. The FWNE device 10 is running at bridging mode as a bridge. Network3 23 is within the wired connection range of the location of the FWNE device 10, and network3 23 needs communicate with network1 21.Network2 22 is connected to the FWNE device 10 wirelessly. The bridge function of the FWNE device 10 handles transparently, thus the three networks are jointed together. The network1 21 and network2 22 extend the range to each other.

FIG. 3 Operation

The FWNE device 10 is configured with three wireless networking units which are capable to communicate with each remote network device. The FWNE device 10 can operate as a bridge, or router, or switch. All of the networking packets come from the three networks will be redirected to destination by the Fixed Wireless Network Extender (FWNE) device 10.

FIG. 4 Operation

The FWNE device 10 works as a sub node device for a hierarchical wireless networking system. This is a typical Internet networking system. The wireless networking radio unit 102 of the FWNE device 10 is configured with the same type of the main network 41. The FWNE device 10 is working as a router, it routes the network traffic between the main network 41 to the three sub networks 42,43,44. When applying to Internet networking, the FWNE device 10 distributes the bandwidth from the main network to the three client networks 42,43,44. One alternate operation of this embodiment is: When there is not line of sight between main network 41 and three sub networks 42,43,44 or the distance is out of range, the FWNE device 10 works as repeater node as well as a extend node. The FWNE device 10 can be configured with four different wireless units. It is capable to extend the wireless network through multiple different types of wireless links, thus this provides the great flexibility to wireless networking, also greatly improves the frequency usage and minimize the interference in the networking field.

FIG. 5 Operation

The FWNE device 10 functions as a router node for a wired main network 51 connecting to three sub networks via different directional fixed wireless links. The FWNE device 10 distributes the bandwidth from wired main network 51 to three sub networks 513,523,533, and functions as a gateway device for those three sub networks.

Conclusion, Ramifications, and Scope

Accordingly, it can be seen that, according to the invention, I have provided a fixed wireless networking device called the Fixed Wireless Network Extender (FWNE), which provides a simple one unit node solution for fixed wireless networking deployment. The device of this invention can be deployed to many locations, which are not applicable to the prior art, and greatly extend the range of the fixed wireless network. The device of the current invention can connect to multiple different wireless networks and function as a key node, which cannot be achieved by prior art. Furthermore, the Fixed Wireless Network Extender (FWNE) device has the additional advantages in that:

it can be configured with multiple same type of wireless networking units to expend the wireless networking capability of a single node site.

it can be upgraded from the current wireless network to future generation by only changing the wireless networking radio unit and without changing the whole network system.

it requires less power, due to one unit design.

it is more environment friendly by providing the flexibility to reach the place where network needs to go, controversy to prior art needs high gain to penetrate to the remote site to get communicate and emits too much unnecessary radio frequency to the environment.

it saves the cost when multiple different wireless networks need to joint together.

it saves the network deployment time a lot by its one unit design.

it provides higher system reliability than prior art of networking.

it provides the possibility to connect the wireless network where the prior art cannot reach.

Although the description above contains much specificity, these should not be construed as limiting the scope of the invention but as merely providing illustrations of some of the presently preferred embodiments of this invention. Various other embodiments and ramifications are possible within it's scope. For example, The Fixed Wireless Network Extender (FWNE) device 10 can function as a complete functional WPOP, when configured with point to multipoint wireless networking units.

Multiple Fixed Wireless Network Extender (FWNE) devices 10 may be deployed to the same location to form a high capacity WPOP.

The Fixed Wireless Network Extender (FWNE) device 10 may be configured with only one wireless networking unit and one wired interface, and become a client site device.

The Fixed Wireless Network Extender (FWNE) device 10 may be installed indoor or campus environment to create a mobile wireless networking environment.

The Fixed Wireless Network Extender (FWNE) device 10 may not comprise the radio control unit 163, when all the radio units do not require additional control.

The Fixed Wireless Network Extender (FWNE) device 10 may comprise the antennas for the wireless networking radio units.

The wireless networking radio units may be built on the same PCB, and configure the device by turn on and off each units;

The Fixed Wireless Network Extender (FWNE) device 10 may be used in indoor environment, when configured with multiple different wireless networking radio units and indoor antennas, the Fixed Wireless Network Extender (FWNE) device 10 can create a high capacity indoor wireless environment for multiple different wireless devices.

Thus the scope of the invention should be determined by the appended claims and their legal equivalents, rather than by the examples given.

What is claimed is:

1. A fixed wireless network extender (FWNE) device comprising:
   one processor unit
   a plurality of system buses
   one control unit monitors and controls the performance of the radio units
   a plurality of wireless networking radio units
   a plurality wired networking units
   wherein processor unit running system software and computer networking software; and
   wherein said system buses are computer system bus for networking device; and
   wherein said system buses are computer system bus for the interface device of networking device; and
   wherein said wireless networking radio units having function of wireless networking with remote same type of wireless networking device; and
   wherein said wireless networking radio units having function of sending and receiving RF signal; and
   Whereby said a plurality of wireless networking radio units are attached to said system buses; and
   Whereby said a plurality of wireless networking radio units may be attached to said system buses via interface means; and
   Whereby said a plurality of wired networking units are attached to said system buses.

2. The FWNE device of claim 1 wherein the processor unit having networking features means for processing computer networking packets among said wireless networking radio units and wired networking units.

3. The FWNE device of claim 1 wherein having selective number and type of said wireless networking radio units for different networking applications.

4. The FWNE device of claim 1 wherein said wireless networking radio units having some type and working at different RF channels.

5. The FWNE device of claim 1 wherein said wireless networking radio units having same type and working with different RF isolation means for avoiding self-interference.

6. The FWNE device of claim 1 wherein the radio control unit is an optional unit for said wireless network radio units needing additional hardware controls.

7. The FWNE device of claim 1 wherein said wireless networking radio units are built on the same PCB.

8. The FWNE device of claim 7 wherein having configuration means for turning on and off each said wireless networking radio units.

9. Apparatus according to claim 1 for interconnecting a plurality of networks, comprising:
   one said ANNE device of claim 1 having a plurality of said wireless networking radio units; and
   communicating a plurality of said wireless networking radio units to remote correspondent wireless networking radio and the networks behind them; and
   said FWNE device performing as central networking feature means for the networking communication among all the said remote wireless networking radio and the networks behind them.

10. Apparatus according to claim 9 wherein one of the said remote networks is the main network.

11. Apparatus according to claim 1 for interconnecting a plurality of networks, comprising:
   having a said FWNE device of claim 1 configured with a plurality of said wireless networking radio units; and
   communicating a plurality of said wireless networking radio units to remote correspondent wireless networking radio and the networks behind them; and
   having a said FWNE device of claim 1 configured with a plurality of said wired networking units; and
   connecting a plurality of said wired networking units to correspondent wired networks; and
   said FWNE device performing as central networking feature means for the networking communication among all the said remote wireless networking radio and the networks behind them.

12. Apparatus according to claim 11 wherein one of the said remote networks is main network.

13. Apparatus according to claim 11 wherein one of the said wired networks is main network.

* * * * *

UNITED STATES PATENT AND TRADEMARK OFFICE
CERTIFICATE OF CORRECTION

| | |
|---|---|
| PATENT NO. | : 7,003,291 B2 |
| DATED | : February 21, 2006 |
| INVENTOR(S) | : Franklin Zhigang Zhang |

It is certified that error appears in the above-identified patent and that said Letters Patent is hereby corrected as shown below:

<u>Title page,</u>
Item [12], change "zhnag" to -- Zhang --.
Item [76], Inventor, change "Zhnag" to -- Zhang --.

Signed and Sealed this

Sixth Day of June, 2006

JON W. DUDAS
*Director of the United States Patent and Trademark Office*